(12) United States Patent
Chu

(10) Patent No.: US 7,266,052 B2
(45) Date of Patent: Sep. 4, 2007

(54) METHOD FOR OPERATION OPTICAL DISC CHANGER USING VIRTUAL MEMORY

(75) Inventor: Hsiu-Ming Chu, Pingjhen (TW)

(73) Assignee: Quanta Storage Inc., Tao Yuan Shien (TW)

( * ) Notice: Subject to any disclaimer, the term of this patent is extended or adjusted under 35 U.S.C. 154(b) by 784 days.

(21) Appl. No.: 10/638,342

(22) Filed: Aug. 12, 2003

(65) Prior Publication Data

US 2004/0167643 A1    Aug. 26, 2004

(30) Foreign Application Priority Data

Feb. 24, 2003   (TW) .............................. 92103826 A

(51) Int. Cl.
*G11B 21/08* (2006.01)
(52) U.S. Cl. .................. 369/30.23; 700/94; 381/58
(58) Field of Classification Search .................. None
See application file for complete search history.

(56) References Cited

U.S. PATENT DOCUMENTS

| | | | | |
|---|---|---|---|---|
| 5,917,782 A | * | 6/1999 | Kim et al. ............... | 369/30.23 |
| 6,226,237 B1 | * | 5/2001 | Chan et al. ............... | 369/30.36 |
| 6,310,848 B1 | * | 10/2001 | Ueki ........................ | 369/30.23 |
| 6,332,175 B1 | * | 12/2001 | Birrell et al. ............ | 369/30.23 |
| 6,377,530 B1 | * | 4/2002 | Burrows .................. | 369/30.23 |
| 6,674,692 B1 | * | 1/2004 | Holland .................... | 369/7 |
| 6,771,568 B2 | * | 8/2004 | Hochendoner ........... | 369/30.23 |
| 6,836,385 B2 | * | 12/2004 | Naohara et al. ............ | 360/15 |

* cited by examiner

*Primary Examiner*—Tan Dinh
(74) *Attorney, Agent, or Firm*—Rabin & Berdo, P.C.

(57) ABSTRACT

A data processing method of a virtual optical disk applied in an optical disk system is provided. The method includes steps as follows: Firstly a sound source determining procedure is executed. If the sound source is not from a virtual optical disk, a pre-processing and a buffer playing process are executed, and also a state changing process is executed while the buffer playing process is executed. According to a result of the state changing process, one of the following three steps is executed: the sound source determining procedure, the pre-processing procedure, and an idle determining procedure. If the system is not idling when executing the idle determining procedure, the buffer playing process is thus executed. Otherwise, a state assessment process is then executed. In accordance with the state assessment process, a storage capacity planning procedure, a write process or the state changing process is then executed.

14 Claims, 7 Drawing Sheets

METHOD FOR OPERATION OPTICAL DISC CHANGER USING VIRTUAL MEMORY

This application claims the benefit of Taiwan application Ser. No. 92103826, filed Mar. 24, 2003.

BACKGROUND OF THE INVENTION

1. Field of the Invention

The invention relates in general to a data processing method of an optical disk, and more particularly to a data processing method of a virtual optical disk.

2. Description of the Related Art

Along with the continuous advance of technology, users' demand for multimedia is much higher than before. In addition to pursuing an excellent sound quality, having the same good video and audio quality in any environment is also a widely-needed demand.

Taking an automobile as an example, no matter what rank or brand a car is, the automobile audio is always an attractive focus in commercial advertisement. Some automobile types are even equipped with a LCD (Liquid Crystal Display) monitor to play VCD or DVD movies, so as to create and achieve the best performance of the sight and sound sensation atmosphere. Compact disks are still the main storage media for video and audio presently, including music CDs, VCD, or DVD, etc., which are all presented in the form of disks. Therefore, despite the equipment of the radio and the Tape Player in the automobile audio system, the radio and the Tape Player play a subordinate role in the audio system due to less use relatively. Comparatively, an optical disk drive plays an important role in the audio system.

The current optical disk player system can be classified into about two categories: a single-disk type and a multi-disk type. Referring to FIG. 1, a conventional single-disk type of the optical disk system is shown. The single-disk type of the optical disk system includes at least a sound host 110, a speaker 130, and a display unit 140. The speaker 130 is an audio output device, with four sound modes or six sound modes for example. The display unit 140 is for indicating a current state of the sound host 110. When an optical disk is put into the sound host 110, function keys on the panel board are provided to control the playing of the optical disk. Further, when a different function key is pressed, that is to say, a corresponding play signal PS according to the function key is inputted to the sound host 110, so that the sound host 110 can execute a designated action according to the play signal PS. Despite somewhat different compositions according to different design concept, generally speaking, the play signals PS often include a Play/Pause signal, a Next Track signal, a Previous Track signal, a Fast Forward signal, a Rewind signal, an Eject signal, and a Mute signal, etc, which fully facilitate the control and benefit users.

Sequentially, referring to FIG. 2, a conventional multi-disk type of the optical disk system is shown. This multi-disk type of the optical disk system can choose to play the contents of multi-disks such as six disks. The current method is to equip a multi-disk optical disk changer 220 in the back boot of an automobile. When a sound host 210 receives a change-disk signal CHD, a corresponding control signal Ctrl according to the change disk signal is thus inputted to the multi-disk optical disk changer 220, so as to choose a specific disk to play accordingly. Certainly the function of the control signal Ctrl is not limited thereto. After a play signal PS is inputted to the sound host 210, the sound host 210 generates a proper control signal Ctrl correspondingly according to the different type of the play signal PS, so that image and audio data AD of the chosen disk in the multi-disk optical disk changer 220 is read. And then a speaker 230 is used for emanating sound. Also, a display unit 240 shows a current playing state, so that the user can be clear at a glance.

Referring to FIG. 3, a flow chart of a conventional data processing method of an optical disk is shown. When the optical disk drive is playing an optical disk, firstly a pre-processing procedure 310 is executed to acquire information according to a parameter of the optical disk, and also to proceed to a seek-target action, so as to make a preparation before the track plays (step 310). After the pre-processing procedure 310 is executed, the optical disk drive executes a play-processing procedure 330 to play selected tracks according to settings of the optical disk, such as play in order or play at random etc., or to play the designated track according to the user's desire (step 330). Sequentially the optical disk drive determines whether a play state is changed or not (step 350), such as a change-track state, an end-of-track state, a change-disk state, or an end-of-disk state, etc. If the play state is changed, an idle determining (step 370) or the pre-processing 310 is executed accordingly. Next, if the result of the idle determining 370 is True, the change state processing 350 is executed. On the other hand, if the result of the idle determining 370 is False, the play processing 330 is thus then executed again.

As we all know, due to the inconvenience of changing optical disks in the single-disk system, the optical disk system, which provides the function of automatically changing multiple optical disks, comes with the tide of fashion. However, despite the conventional multi-disk optical disk system features the convenience of changing disks, by virtue of the mechanical structure of the changer mechanism, a shaking of the car when driving decreases reliability of changing disks. If the car shaking happens frequently, it may even cause damage to machine parts of the changer, and also may cause a huge loss of money for the user. Therefore, how to overcome the problems mentioned above and also how to provide a better and stable optical disk system becomes a crucial task to be dealt with.

SUMMARY OF THE INVENTION

In view of the above-mentioned shortcomings, an object of the present invention is to provide a data processing method of a virtual optical disk. The object of expanding capacity of the optical disk system can be achieved without using the conventional mechanical structure of the multi-disk type of the optical disk drive system.

According to the object of the present invention, a data processing method of a virtual optical disk is provided. The method includes steps as follows:

Firstly a sound source determining procedure is executed to determine whether the sound source is from a virtual optical disk or not. If not, a pre-processing and a buffer playing process are executed in order, and also a state changing process is executed at the same time when the buffer playing process is executed. According to a result of the state changing process, one of the following three steps is chosen to execute: the sound source determining procedure, the pre-processing procedure, and an idle determining procedure. If the system is not idling when executing the idle determining procedure, the buffer playing process is thus executed. On the contrary, if the system is idling, a state assessment process is then executed. In accordance with the state assessment process, a storage capacity planning procedure, a write process or the state changing process is then executed. The idle state of the system here means that the optical disk drive is not in a busy state; including playing a tape or listening to the radio for example, so as to execute an optical disk backup procedure in a setting. On the other hand, if the sound source is from the virtual optical disk when executing the sound source determining procedure, a virtual pre-processing and a virtual buffer playing process are executed in order, and also a virtual state changing process is executed at the same time when the virtual buffer playing process is executed. According to a result of the virtual state changing process, one of the three steps is chosen to execute: the sound source determining procedure, the virtual pre-processing procedure, and the virtual buffer playing process.

Other objects, features, and advantages of the invention will become apparent from the following detailed description of the preferred but non-limiting embodiments. The following description is made with reference to the accompanying drawings.

DETAILED DESCRIPTION OF THE INVENTION

The concept of this invention is using a NVRAM (Non-Volatile Random Access Memory) such as a hard disk or a flash memory to store contents of multiple optical disks, and also to connect the memory with an optical disk system, so as to expand capacity of the optical disk system, and provide a function to play multiple virtual optical disks. What particularly noteworthy is that the contents of multiple optical disks are recorded in the memory, which is different from the conventional method to change optical disks by the changer. Therefore the reliability of changing optical disks will not be influenced by environment, nor will the mechanical damage resulted from the conventional method occur in the present invention.

Figure 1:
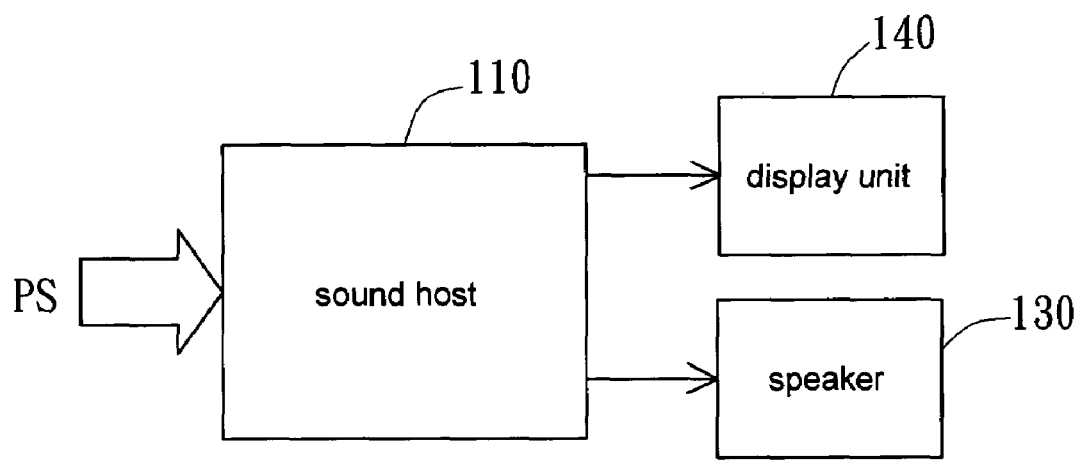
FIG. 1 (prior art) shows a conventional single-disk type of the optical disk system.
Figure 2:
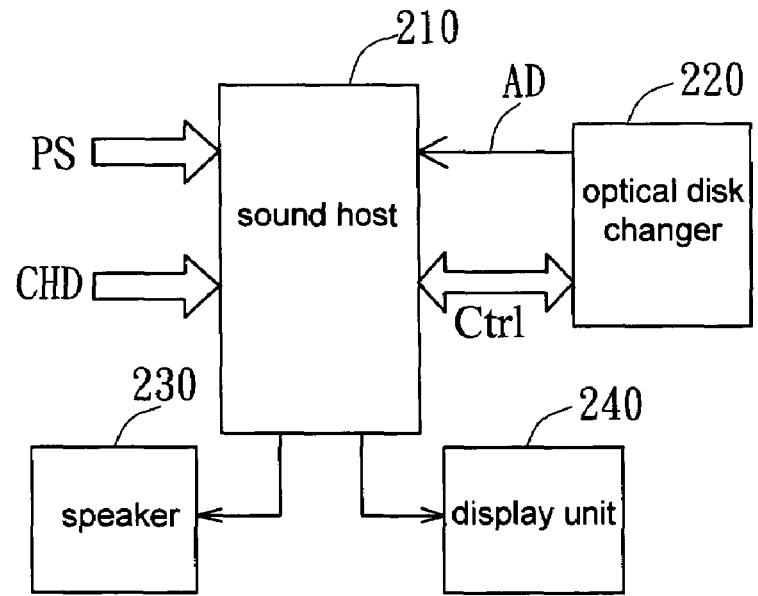
FIG. 2 (prior art) shows a conventional multi-disk type of the optical disk system.
Figure 3:
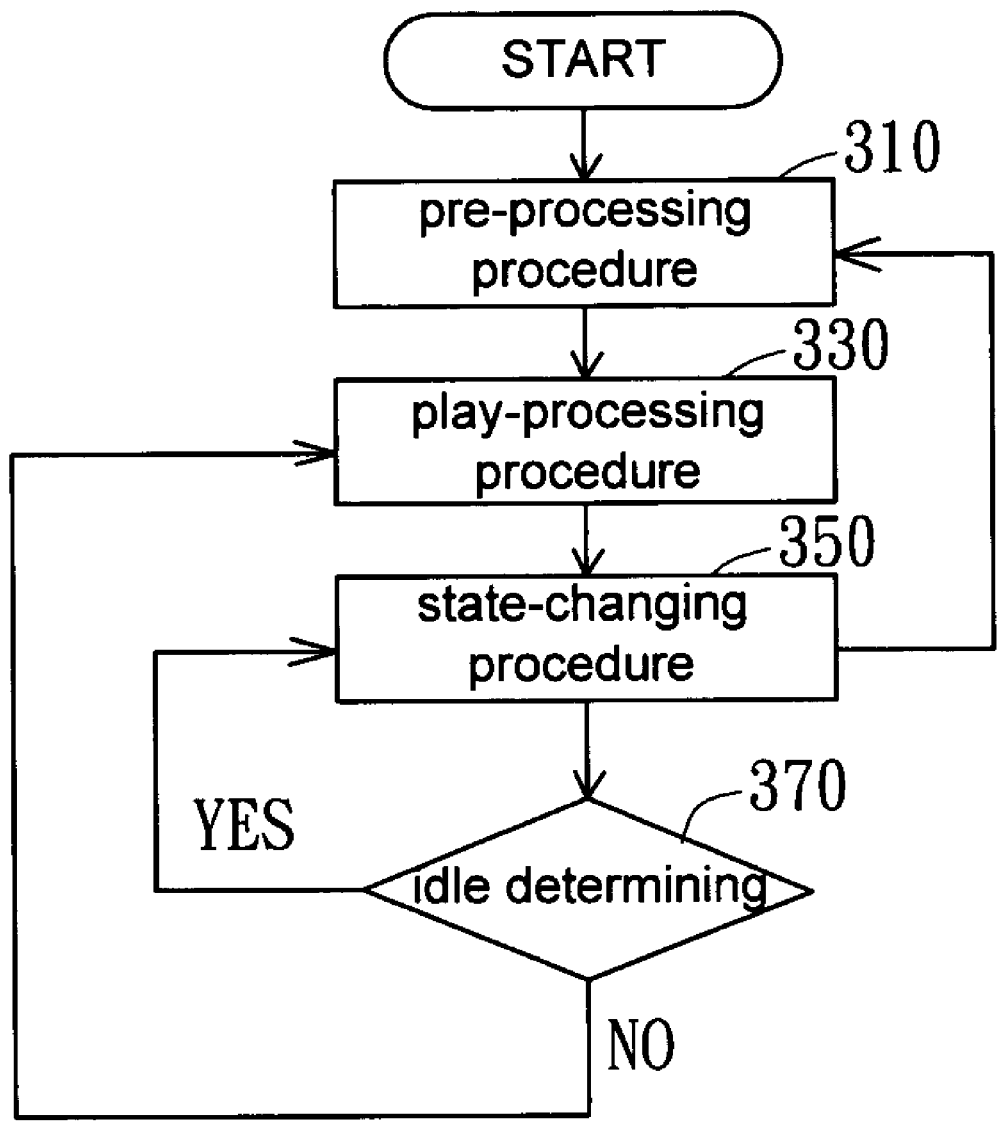
FIG. 3 (prior art) shows a flow chart of a conventional data processing method of an optical disk.
Figure 4A:
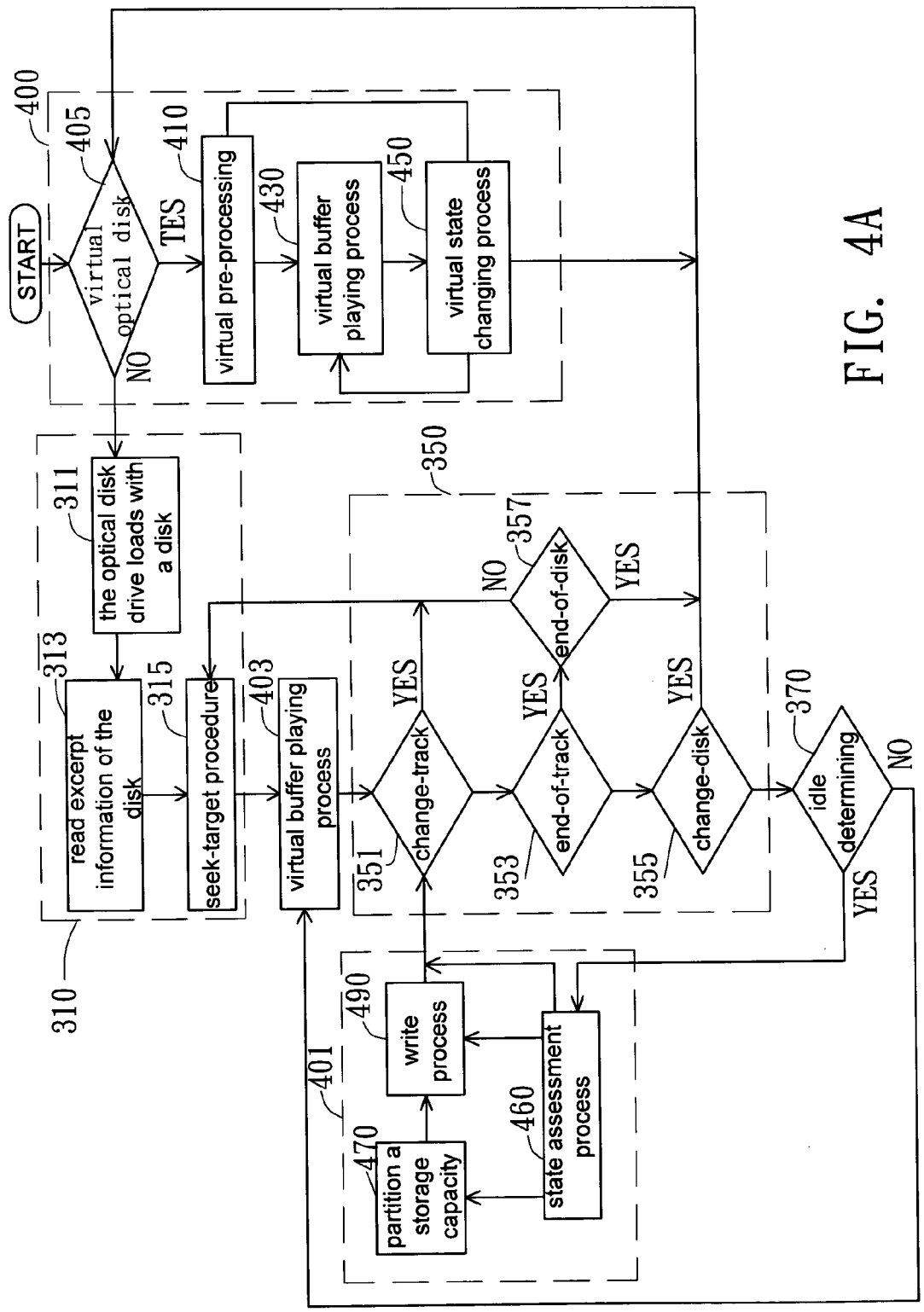
FIG. 4A illustrates a flow chart of a data processing method of a virtual optical disk of a preferred embodiment according to the present invention.

Referring to FIG. 4A, a flow chart of a data processing method of the virtual optical disk of a preferred embodiment according to the present invention is shown. The features of the present invention includes a virtual play procedure 400, an optical disk backup procedure 401, and a virtual buffer playing process 403. The virtual playing procedure 400 is to have the system play virtual optical disk tracks stored in the memory. The optical disk backup procedure 401 backups tracks data of the physical optical disks and stores in the memory during the idle time of a physical optical disk drive. The buffer playing process 403 reads a data of a desired track in advance, stores the data to the memory, and then plays the data. Detailed procedure mentioned above will be further explained as follows.

In practical application, a user can partition the memory elastically or have the system to allocate automatically into several virtual optical disk drives, for example six virtual optical disk drives, so as to store contents of six optical disks respectively. When playing, the user can decide whether the sound source is played from the virtual optical disk drives or from the physical optical disk drive (that is physical optical disks in the optical disk drive). In the beginning, a playing state is determined in advance. If the tape or the radio is played, the system directly jumps to a step 460 of a state assessment process to proceed to the optical disk backup procedure in a setting. If the optical disk is played, a sound source determining procedure 405 is executed firstly to determine whether the sound source is from the virtual optical disk drive or not. If the sound source is from a physical optical disk drive, which is not the virtual optical disk drive, the pre-processing 310 and the buffer playing process 403 are executed in order, and also the state change process 350 is executed at the same time when the buffer playing process 403 is executed. The following data processing procedures are determined by a determining result of the state changing process 350. What particularly significant is that when executing the buffer playing process 403, not only the tracks of the optical disk can be direct played, but also a section data of the desired track can be read rapidly in advance and stored in the memory, and then the track is played from the memory. A shockproof property is guaranteed by the buffer effect of the memory when playing the tracks. And also the shockproof time period is different according to different capacity of memory, such as shockproof for 30 seconds or for 45 seconds.

Figure 4B:
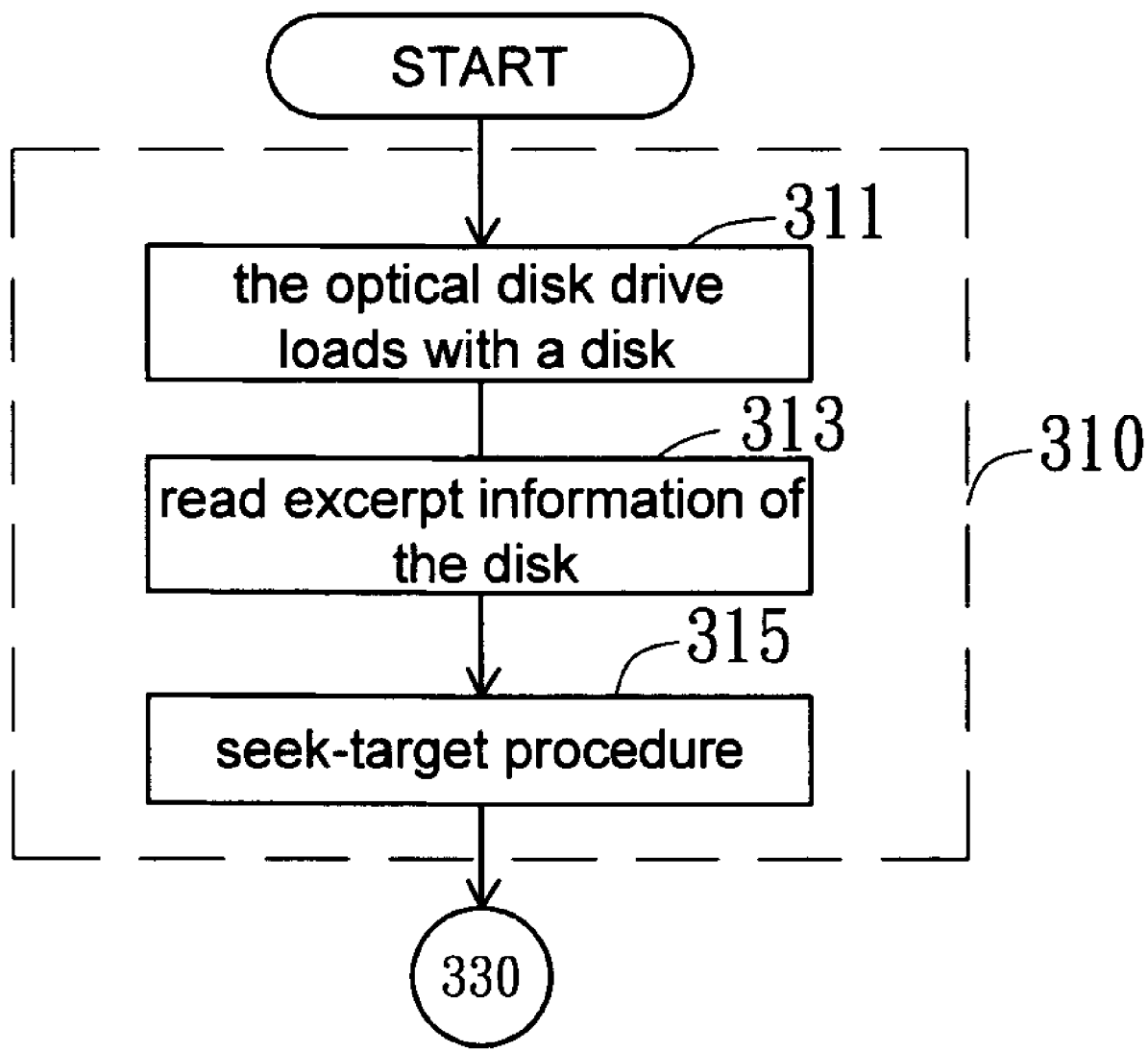
FIG. 4B illustrates a flow chart of the detailed procedures for the pre-processing procedure 310 of the FIG. 4A.

The detailed procedures of the pre-processing 310 and the state changing process 350 are fully illustrated as follows. Referring to FIG. 4B, it illustrates a flow chart of the detailed procedures for the pre-processing procedure 310 of the FIG. 4A. When playing the music, the optical disk drive loads with a disk in advance (step 311), and then reads excerpt information of the disk, such as the number of tracks, lengths, or titles, etc, so as to facilitate the user to operate (step 313). And then the optical disk system proceeds to the seek-target procedure of the track in the manner of play-in-order or play-at-random according to the default value of the system, so as to make a preparation before playing (step 315). Certainly the optical disk system also provides a function for the user to designate a desired track to play at will, following by the seek-target and then proceeding to the play-processing procedure 330.

Figure 4C:
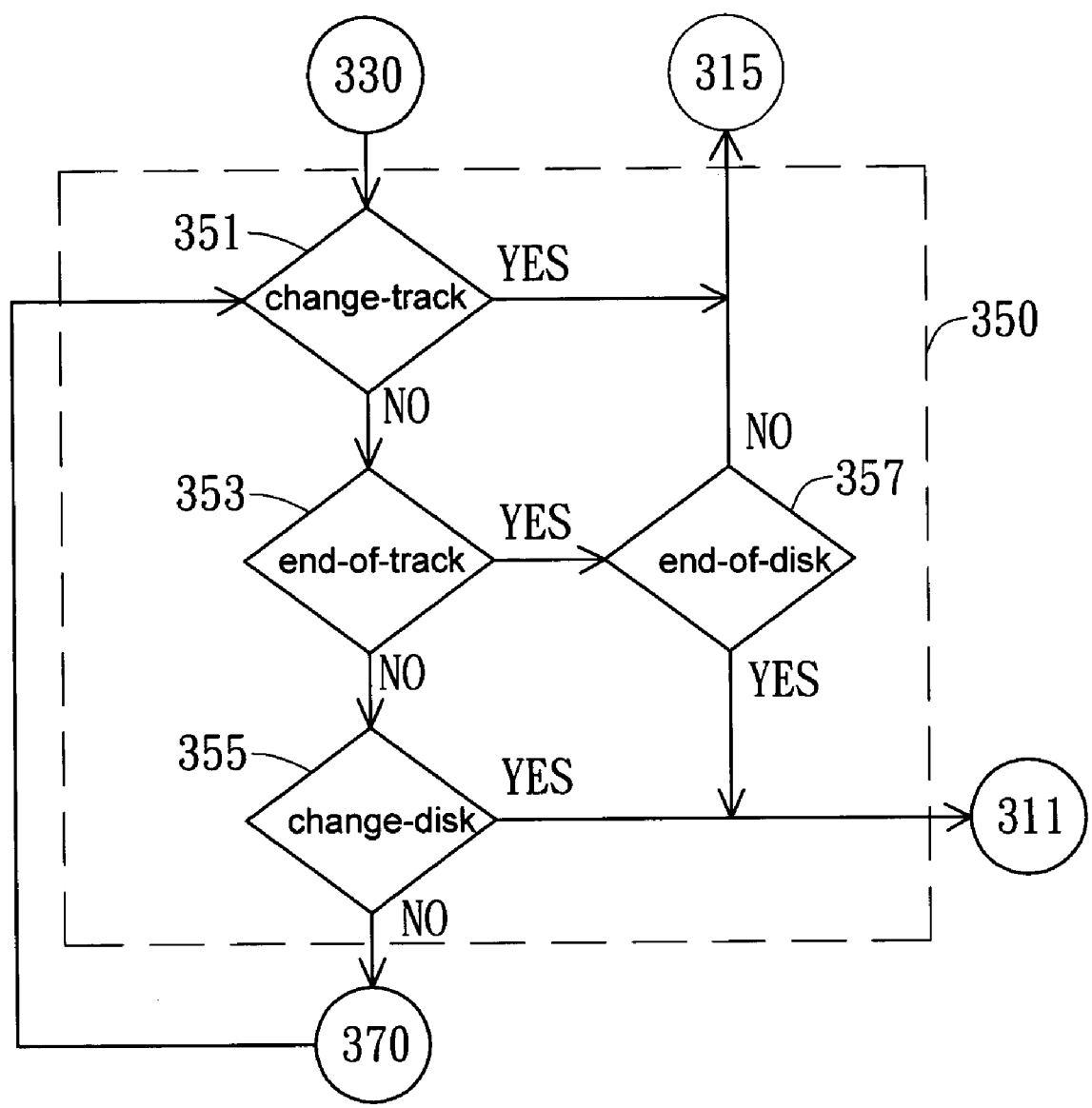
FIG. 4C illustrates a flow chart of the detailed procedures for the change state processing procedure 350 of the FIG. 4A.

Referring to FIG. 4C, it illustrates a flow chart of the detailed procedures for the change state processing procedure 350 of the FIG. 4A. When the optical disk is played, the optical disk system determines whether to change a track or not (step 351). If yes, the system resumes the seek-target procedure 315 of new chosen track; otherwise, the system proceeds to determine whether to end the track or not (step 353). If the result of the end-of-track determining is true, the system further determines whether the playing disk ends or not (step 357). If the playing disk ends, the system proceeds to the pre-processing 310 and to load with a disk (step 311) again, while if the playing disk does not end, the system proceeds to the seek-target procedure 315 of new track again. On the other hand, if the result of the end-of-track determining is false, the system proceeds to determine whether to change a disk or not (step 355). If the result of the change disk determining is true, a new disk is loaded again (step 311; otherwise if the result of the change disk determining is false, the system proceeds to the idle determining procedure 370.

Figure 4D:
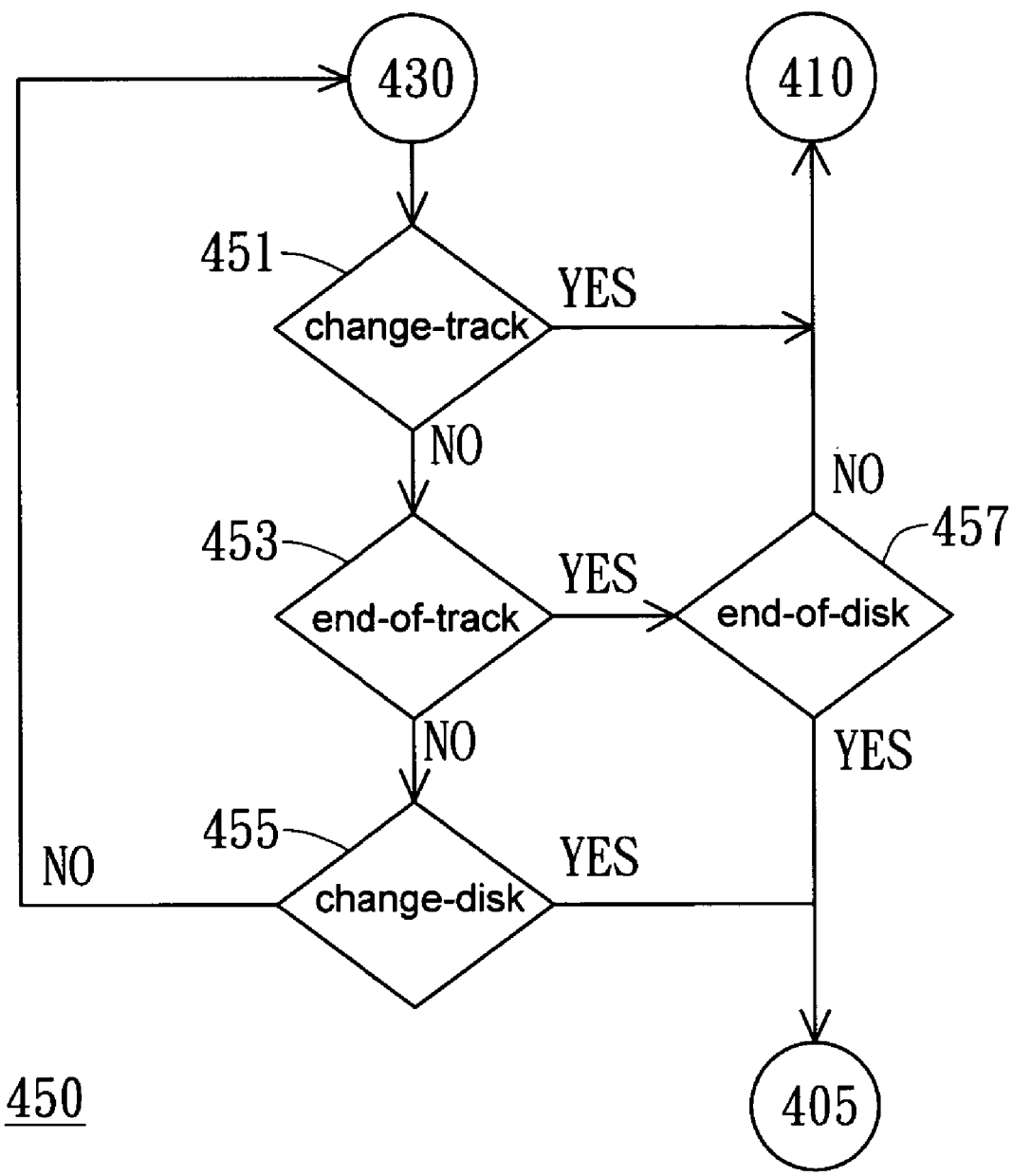
FIG. 4D illustrates detailed procedures of the virtual state changing process 450.

When executing the state changing process 350, if end-of-disk or change-disk is true, the sound source determining procedure 405 is executed again to determine whether the sound source is from the virtual optical disk drive or the physical optical disk drive. If the sound source is from the virtual optical disk drive, the virtual pre-processing 410 and the virtual buffer playing process 430 are executed in order. The virtual pre-processing 410 is for acquiring data of the chosen virtual optical disk drive so as to prepare before tracks are played, so that the virtual buffer playing process 430 can play the chosen tracks. And also a virtual state changing process 450 is executed at the same time when the virtual buffer playing process 430 is executed. According to the result of the virtual state changing process 450, the following data processing procedures are then determined. FIG. 4D illustrates the further processing conditions.

Referring to FIG. 4D, it illustrates detailed procedures of the virtual state changing process 450. When the virtual buffer playing process 430 is executed, whether conditions, like change-track (step 451), end-of-track (step 453), change-disk (step 455), or end-of-disk (step 457), happen or not is determined. If the determining of "change-track" is proved to be true, the virtual pre-processing 410 is executed to acquire related data of the next track; otherwise, if the determining of "change-track" is proved to be false, another determining step of "end-of-track" is executed. If the result of the end-of-track determination is true, another determining step of "end-of-disk" is further executed. If the determining of "end-of-disk" is proved to be true, the sound source determining procedure 405 is executed. On the other hand, if the track hasn't reached its end, whether the disk needs to be changed should be determined. If the disk needs to be changed, the sound source determining procedure 405 should be executed; otherwise, the virtual buffer playing process 430 is executed.

Figure 4E:
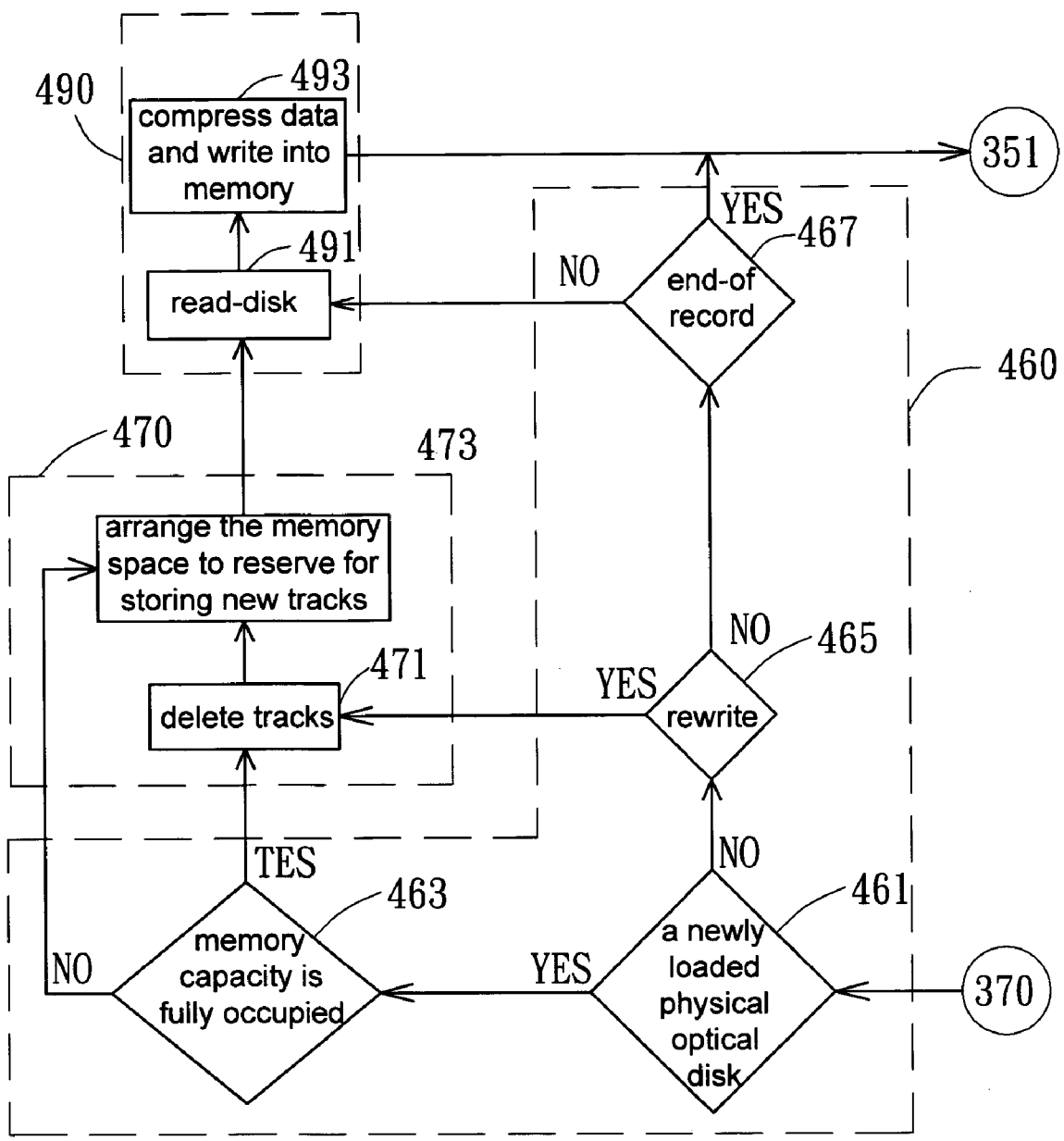
FIG. 4E illustrates detailed processes of the optical disk backup procedure 401.

A further advantage of the invention is that the contents of the optical disks can be stored in the virtual optical disk drive during idle time without interfering the play of the optical disk. In more detail, when the physical optical disk drive is idling, a state assessment process 460 is then executed. Whether a write process 490 is executed right after the state assessment process 460, or after a further step of partitioning a storage capacity (step 470) depends on the result of the state assessment process 460. Herein, the idle state of the physical optical disk drive means that the physical optical disk drive is not in a busy state. Examples thereof include playing a tape or listening to the radio. Besides, the write process 490 means that the track contents of the physical optical disk drive are read, and then written and stored to a NVRAM (Non-Volatile Random Access Memory) providing for the virtual optical disk drive. FIG. 4E illustrates the detailed procedure.

FIG. 4E illustrates detailed processes of the optical disk backup procedure 401. Firstly, the system determines whether the contents of the physical optical disk exist in the virtual optical disk drive or not (step 461). If a new optical disk or new tracks are found, the system determines the capacity of the NVRAM to see whether there is still enough space or not (step 463). If the memory capacity is fully occupied, the user can choose to delete some tracks. The deleting of tracks can be accomplished alternatively through the automatic settings of the system. Tracks which are rarely played or stored for long can be deleted in order to release the storage space (step 471). When there is spare memory space to backup the tracks, the system can arrange the memory space to reserve for storing new tracks (step 473).

On the other hand, if the contents of the physical optical disks have existed in the virtual optical disk drive, the next step is to determine whether old records are needed to be overwritten or not (step 465). If the old records are required to be overwritten, the step 471 is executed to delete some old records. On the other hand, if overwriting is not required, it is then determined whether backup completes (step 467). If backup completes, the step 351 is executed; otherwise, the write process 490 is executed.

What particularly significant is that the write process 490 may include a track data reading (step 491) and the read track data compressing and writing (step 493). Track data can be compressed into a MP3 format, to reduce data capacity and further written into memory, so as to save the memory space and also increase the number of storing tracks.

Accordingly, with the data processing method provided by the present invention, a virtual multi-optical disk sound can be obtained. Apart from the physical optical disks, it also provides other options of stored virtual optical disk. Moreover, an operation interface of the present invention is very similar to the conventional changer. Therefore the invention has advantages of completely shockproof, rapid changing optical disks, stability and reliability.

To conclude comprehensively, the present invention at least includes features as follows:

First, using a NVRAM (Non-Volatile Random Access Memory) is completely shockproof.

Second, playing a virtual optical disk is much more economic in saving electricity than playing a physical optical disk.

Third, the invention does not use a recording method to backup tracks of optical disks. When the optical disk is loaded, the system can make use of system idle time to automatically store the contents of multimedia in the NVRAM. Therefore the user does not need to press any button to start the backup job.

Fourth, the memory can be partitioned into several virtual optical disk drives beforehand, so as to be of random access without a limitation of storing order. And also changing optical disks is very quick without waiting for loading of optical disks.

Fifth, the operation of the virtual optical disk is similar with the conventional optical disk changer, so that the user does not need to change any personal custom and can use it with ease.

Sixth, if the contents of the played physical optical disk have been stored in the virtual optical disk drive, the system can immediately switch to play the virtual optical disk automatically when the playing is instable, so as to increase the stability of the system.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A data processing method of a virtual optical disk, using in an optical disk system, comprising a physical optical disk play processing procedure, wherein the physical optical disk play processing procedure comprises a pre-processing and a buffer playing process, and wherein the data processing method of a virtual optical disk comprises steps of:

executing a sound source determining procedure to obtain a sound source determining result;

executing a virtual play processing procedure according to the sound source determining result, which comprises a virtual pre-processing and a virtual buffer playing process; and executing an optical disk backup procedure according to the sound source determining result;

wherein when the sound source determining result is the virtual optical disk, the virtual play processing procedure is executed, when the sound source determining result is a physical optical disk, the physical optical disk play processing procedure is executed, and when the sound source determining result is a tape player of a radio, the optical disk backup procedure is executed.

2. The data processing method of a virtual optical disk according to claim 1, wherein the virtual play processing procedure further comprises a virtual state changing process, and according to a result of the virtual state changing process, one of the three steps, the sound source determining procedure, the virtual pre-processing, and the virtual buffer playing process, is chosen to execute.

3. The data processing method of a virtual optical disk according to claim 1, wherein the physical optical disk play processing procedure comprises a state changing process, and according to a result of the state changing process, one of the three steps, the sound source determining procedure, the pre-processing, and an idle determining procedure, is chosen to execute.

4. The data processing method of a virtual optical disk according to claim 3, wherein when a result of the idle determining procedure is true, a state assessment process is executed, and when the result of the idle determining procedure is false, the buffer playing process is executed.

5. The data processing method of a virtual optical disk according to claim 1, wherein a storage capacity planning procedure is executed according to the state assessment process.

6. The data processing method of a virtual optical disk according to claim 1, wherein a write process is executed according to the state assessment process.

7. A data processing method of a virtual optical disk, using in an optical disk system, wherein the data processing method of a virtual optical disk comprises steps of:

executing a sound source determining procedure to determine whether the sound source is from the virtual optical disk or not: wherein if it is determined that the sound source is not from the virtual optical disk, a step a is executed; if it is determined that the sound source is from the virtual optical disk, a virtual pre-processing and a virtual buffer playing process are executed in order, wherein a virtual state changing process is executed at the same time while executing the virtual buffer playing process, and also according to a result of the virtual state changing process, one of the three steps: the sound source determining procedure, the virtual pre-processing procedure, and the virtual buffer playing process is chosen to execute;

a. executing a pre-processing and a buffer playing process in order, wherein a state changing process is executed at the same time while executing the buffer playing process; and also according to a result of the state changing process, one of the following three steps is chosen to execute: the sound source determining procedure, the pre-processing procedure, and an idle determining procedure; wherein if a result of the idle determining procedure is true, a step b is executed; and if the result of the idle determining is false, the buffer playing process is executed;

b. executing a state assessment process, and also according to the result of the state assessment process, one of three steps is chosen to execute: a step c, a step d, and the state assessment process;

c. executing a storage capacity planning procedure, and then executing a write process after finishing the storage capacity planning procedure, wherein the state changing process is executed at the same time while executing the write process, and also according to a result of the state changing process, one of the three steps: the sound source determining procedure, the pre-processing, and the idle determining procedure is chosen to execute; and d. executing the write process, wherein the state changing process is executed at the same time while executing the write process, and also according to a result of the state changing process, one of the three steps: the sound source determining procedure, the pre-processing, and the idle determining procedure is chosen to execute.

8. The data processing method of a virtual optical disk according to claim 7, wherein the virtual state changing process comprises steps of:

determining whether change track or not, if yes, executing the virtual pre-processing; otherwise, executing a step i;

i. determining whether end of track or not, if yes, executing a step j; otherwise, executing a step k;

j. determining whether end of disk or not, if yes, executing the sound source determining procedure; otherwise, executing the virtual pre-processing; and k. determining whether change disk or not, if yes, executing the sound source determining procedure; otherwise, executing the virtual buffer playing process.

9. The data processing method of a virtual optical disk according to claim 7, wherein the write process comprises steps of:

reading current playing track data; and compressing the track data and storing into memory.

10. The data processing method of a virtual optical disk according to claim 7, wherein the storage capacity planning procedure comprises steps of:

m. deleting designated records, and n. reserving space for unrecorded data.

11. The data processing method of a virtual optical disk according to claim 10, wherein the state assessment process comprises steps of:

determining whether a newly loaded physical optical disk is a new optical disk or not, if yes, executing a step o; otherwise, executing a step p;

o. determining whether the memory capacity is exhausted, if yes, executing steps m and n in order; otherwise, executing step n;

p. determining whether rewriting present records is required, if yes, executing the steps m and n in order; otherwise, executing a step q; and q. determining whether a current playing track has been recorded or not, if yes, executing the state changing process; otherwise, executing the write process.

12. The data processing method of a virtual optical disk according to claim 11, wherein the write process comprises steps of:

reading current playing track data; and compressing the track data and storing into memory.

13. A data processing method of a virtual optical disk, using in an optical disk system, wherein the data processing method comprises steps of: executing a sound source determining procedure to determine whether the sound source is from the virtual optical disk or not: if not, executing a step a; if yes, executing a virtual pre-processing and a virtual buffer playing process in order, wherein a virtual state changing process is executed at the same time while the virtual buffer playing process is executed, and also according to a result of the virtual state changing process, one of the three steps: the sound source determining procedure, the virtual pre-processing procedure, and the virtual buffer playing process is chosen to execute;

- a. executing a pre-processing and a buffer playing process in order, wherein a state changing process is executed at the same time while executing the buffer playing process; and also according to a result of the state changing process, one of the following three steps is chosen to execute: the sound source determining procedure, the pre-processing procedure, and an idle determining procedure; wherein if a result of the idle determining procedure is true, a step b is executed; and if the result of the idle determining is false, the buffer playing process is executed;
- b. determining whether a newly loaded physical optical disk is a new optical disk or not, if yes, executing a step o; if not, executing a step p;
- o. determining whether the memory capacity is exhausted, if yes, deleting designated records and reserving space for unrecorded data, and executing a step c; if not, directly reserving space for unrecorded data and executing the step c;
- p. determining whether rewriting present records is required, if yes, deleting designated records and reserving space for unrecorded data, and executing a step c; if not, executing a step q; and
- q. determining whether a current playing track has been recorded or not, if yes, executing the state changing process; if not, executing the step c; and
- c. reading current playing track data and compressing the track data and storing into memory; wherein the state changing process is executed at the same time while executing the write process, and also according to a result of the state changing process, one of the three steps: the sound source determining procedure, the pre-processing, and the idle determining procedure is chosen to execute.

14. The data processing method of a virtual optical disk according to claim 13, wherein the virtual state changing process comprises the following steps:

determining whether change track or not, if yes, executing the virtual pre-processing; otherwise, executing a step i;
- i. determining whether end of track or not, if yes, executing a step j; otherwise, executing a step k;
- j. determining whether end of disk or not, if yes, executing the sound source determining procedure; otherwise, executing the virtual pre-processing; and
- k. determining whether change disk or not, if yes, executing the sound source determining procedure; otherwise, executing the virtual buffer playing process.

* * * * *